United States Patent
Liu et al.

(10) Patent No.: US 11,915,154 B2
(45) Date of Patent: Feb. 27, 2024

(54) MANAGING ARTIFICIAL INTELLIGENCE MODEL PARTITIONS FOR EDGE COMPUTING ENVIRONMENT

(71) Applicant: EMC IP Holding Company LLC, Hopkinton, MA (US)

(72) Inventors: Jinpeng Liu, Shanghai (CN); Jin Li, Shanghai (CN); Zhen Jia, Shanghai (CN); Christopher S. MacLellan, Uxbridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 818 days.

(21) Appl. No.: 16/925,864

(22) Filed: Jul. 10, 2020

(65) Prior Publication Data

US 2022/0012607 A1    Jan. 13, 2022

(51) Int. Cl.
*G06N 20/00* (2019.01)
*G06F 9/48* (2006.01)
*G06N 5/04* (2023.01)
*G06F 9/50* (2006.01)

(52) U.S. Cl.
CPC ............. *G06N 5/04* (2013.01); *G06F 9/4881* (2013.01); *G06F 9/5077* (2013.01); *G06N 20/00* (2019.01)

(58) Field of Classification Search
CPC ................................ G06N 5/04; G06F 9/4881
See application file for complete search history.

(56) References Cited

U.S. PATENT DOCUMENTS

| | | | |
|---|---|---|---|
| 2019/0324810 A1 | 10/2019 | Zhao et al. | |
| 2020/0249998 A1* | 8/2020 | Che | G06N 20/00 |
| 2021/0019152 A1* | 1/2021 | Pudipeddi | G06N 3/084 |
| 2021/0073625 A1* | 3/2021 | Cai | G06N 3/04 |
| 2021/0248115 A1* | 8/2021 | Jones | G06F 9/5038 |
| 2022/0197773 A1* | 6/2022 | Butler | G06F 9/5038 |

OTHER PUBLICATIONS

Kim et al., "STRADS: A Distributed Framework for Scheduled Model Parallel Machine Learning", 2016 (Year: 2016).*
Wikipedia, "Intermediate Representation," https://en.wikipedia.org/w/index.php?title=Intermediate_representation&direction=next&oldid=905361000, Jan. 24, 2020, 4 pages.
Jia et al., "Beyond Data and Model Parallelism for Deep Neural Networks," Proceedings of the 2nd SysML Conference, Palo Alto, CA, Jul. 2018, 13 pages.

(Continued)

*Primary Examiner* — Selene A. Haedi
(74) *Attorney, Agent, or Firm* — Ryan, Mason & Lewis, LLP

(57) ABSTRACT

Techniques are disclosed for managing artificial intelligence model partitions for execution in an information processing system with edge computing resources. For example, a method comprises the following steps. An intermediate representation of an artificial intelligence model is obtained. A computation graph is generated based on the intermediate representation. The computation graph is partitioned into a set of partitions. The method then schedules the set of partitions for respective execution on a set of computing devices in an edge computing environment, and causes deployment of the set of partitions respectively to the set of computing devices for execution in the edge computing environment.

20 Claims, 7 Drawing Sheets

(56) References Cited

OTHER PUBLICATIONS

Wikipedia, "Deep Learning," https://en.wikipedia.org/wiki/Deep_learning, Feb. 6, 2020, 33 pages.

Wikipedia, "Everything as a Service," https://simple.wikipedia.org/wiki/Everything_as_a_service, Aug. 23, 2019, 2 pages.

L. Song et al., "HyPar: Towards Hybrid Parallelism for Deep Learning Accelerator Array," arXiv:1901.02067v1, Jan. 7, 2019, 13 pages.

GITHUB, "OpenNESS Architecture and Solution Overview," https://github.com/open-ness/specs/blob/master/doc/architecture.md, accessed Jul. 7, 2020, 15 pages.

Amazon Web Services, "Machine Learning Inference with AWS IoT Greengrass Solution Accelerator" https://aws.amazon.com/iot/solutions/mli-accelerator/, Oct. 2019, 5 pages.

U.S. Appl. No. 16/540,385 filed in the name of Jinpeng Liu et al. on Aug. 14, 2019, and entitled "Method, a Device and a Computer Program Product for Determining a Resource Required for Executing a Code Segment.".

U.S. Appl. No. 16/542,757 filed in the name of Jinpeng Liu et al. on Aug. 16, 2019, and entitled "Method, Device and Computer Program Product for Processing Machine Learning Model.".

U.S. Appl. No. 16/678,758 filed in the name of Jinpeng Liu et al. on Nov. 8, 2019, and entitled "Method, Electronic Device and Computer Program Product for Processing Machine Learning Model.".

U.S. Appl. No. 16/789,006 filed in the name of Jin Li et al. on Feb. 12, 2020, and entitled "Scheduling Artificial Intelligence Model Partitions Based on Reversed Computation Graph.".

U.S. Appl. No. 16/823,445 filed in the name of Jinpeng Liu et al. on Mar. 19, 2020, and entitled "Task Scheduling Method, Electronic Device, and Computer Storage Medium.".

U.S. Appl. No. 16/845,682 filed in the name of Jin Li et al. on Apr. 10, 2020, and entitled "Task Processing Method, Electronic Device, and Computer Program Product.".

\* cited by examiner

100

200

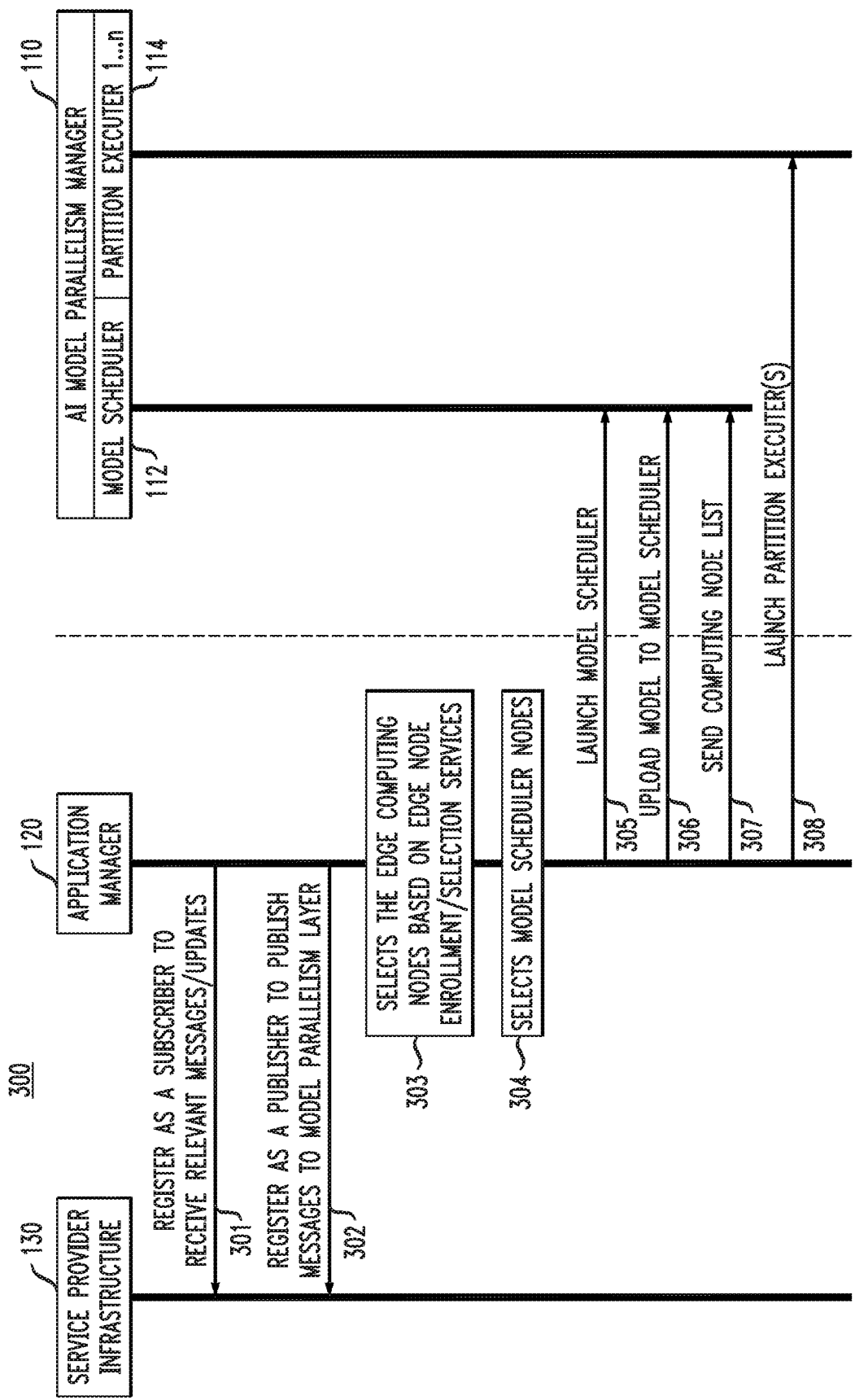

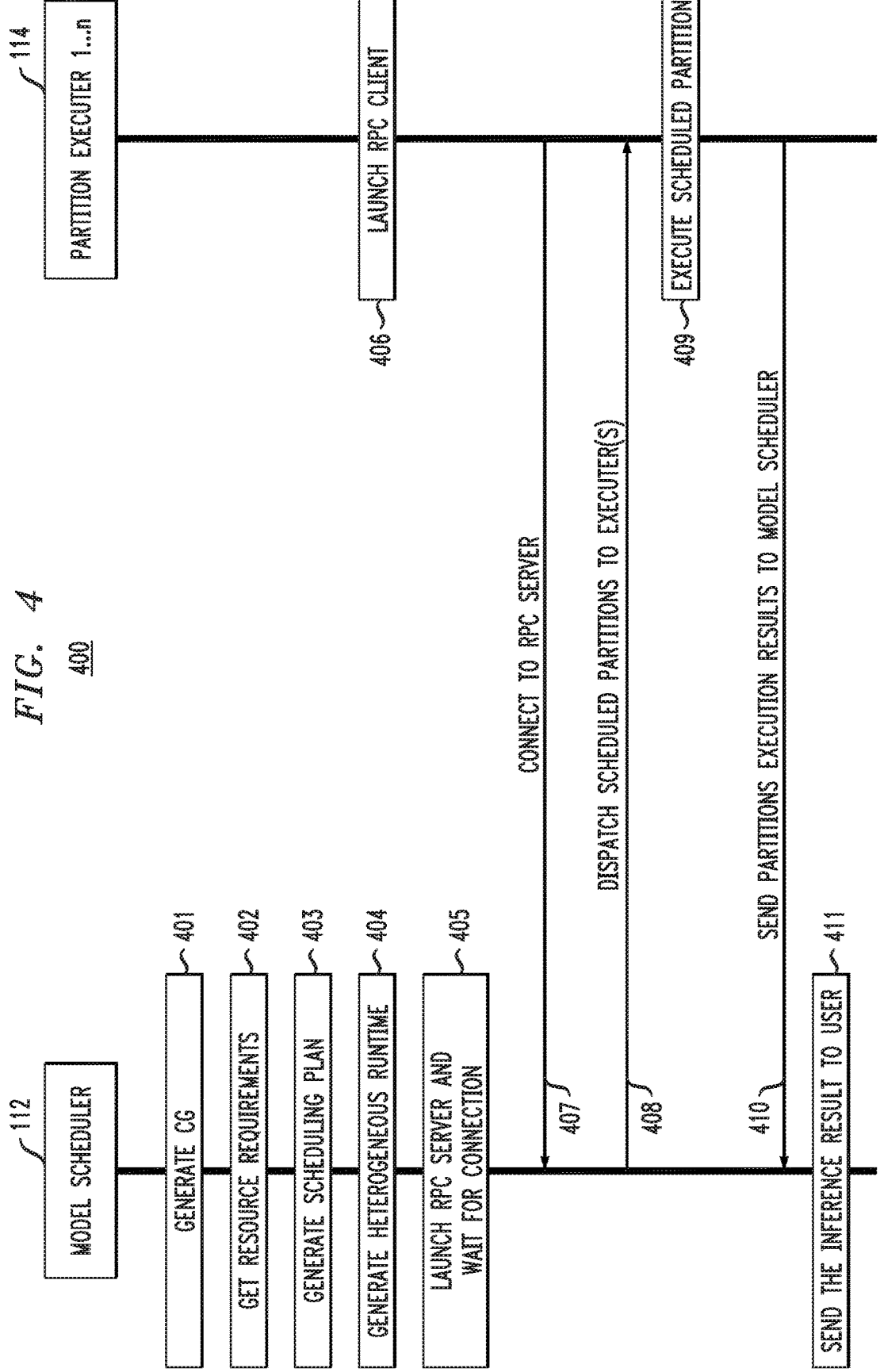

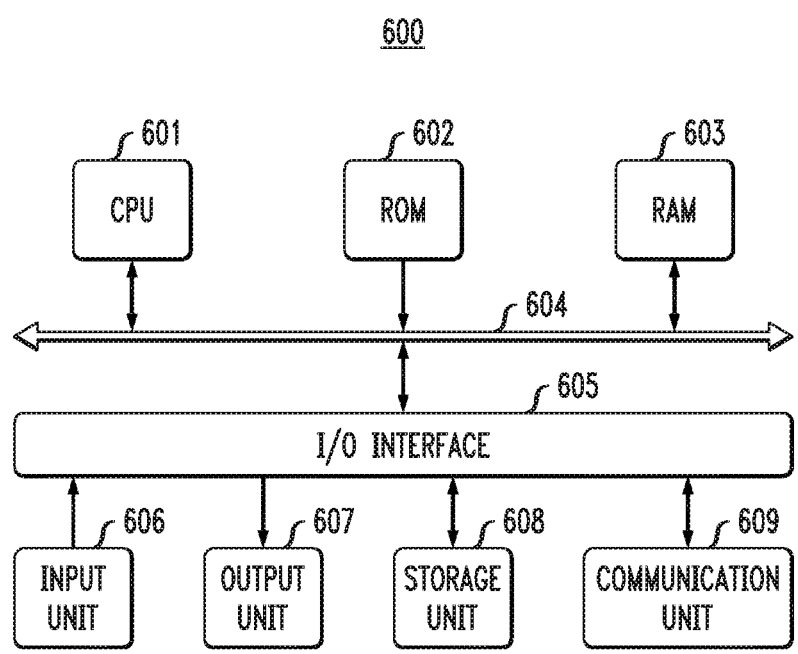

MANAGING ARTIFICIAL INTELLIGENCE MODEL PARTITIONS FOR EDGE COMPUTING ENVIRONMENT

FIELD

The field relates generally to information processing systems, and more particularly to techniques for scheduling artificial intelligence (AI) model partitions in information processing systems with edge computing resources.

BACKGROUND

In recent years, with the progress of artificial intelligence (AI) technology, application programs that employ AI models (such as, but not limited to, machine learning (ML) applications, deep learning (DL) applications, and data mining (DM) applications) have enabled significant development in many fields. However, as AI models become more complicated and need larger data sets, execution of such models requires more computing resources. Currently, due to limitations of computing capability and communication bandwidth of computing devices, a single computing device cannot typically satisfy the demands of a large-scale AI model. Therefore, efficient deployment and execution of AI models has become a focus of current research.

SUMMARY

Embodiments provide techniques for managing artificial intelligence model partitions for execution in an information processing system with edge computing resources.

For example, in an illustrative embodiment, a method comprises the following steps. An intermediate representation of an artificial intelligence model is obtained. A computation graph is generated based on the intermediate representation. The computation graph is partitioned into a set of partitions. The method then schedules the set of partitions for respective execution on a set of computing devices in an edge computing environment, and causes deployment of the set of partitions respectively to the set of computing devices for execution in the edge computing environment.

Advantageously, illustrative embodiments provide a solution to achieve scheduling and deployment with improved efficiency in terms of parallel computation and resource usage within an edge computing environment.

BRIEF DESCRIPTION OF THE DRAWINGS

FIG. 3 illustrates at least a part of a message flow for managing an artificial intelligence model in an edge computing environment according to an illustrative embodiment.

FIG. 4 illustrates at least another part of a message flow for managing an artificial intelligence model in an edge computing environment according to an illustrative embodiment.

FIG. 6 illustrates a processing platform used to implement an information processing system for managing an artificial intelligence model in an edge computing environment according to an illustrative embodiment.

DETAILED DESCRIPTION

Figure 1:
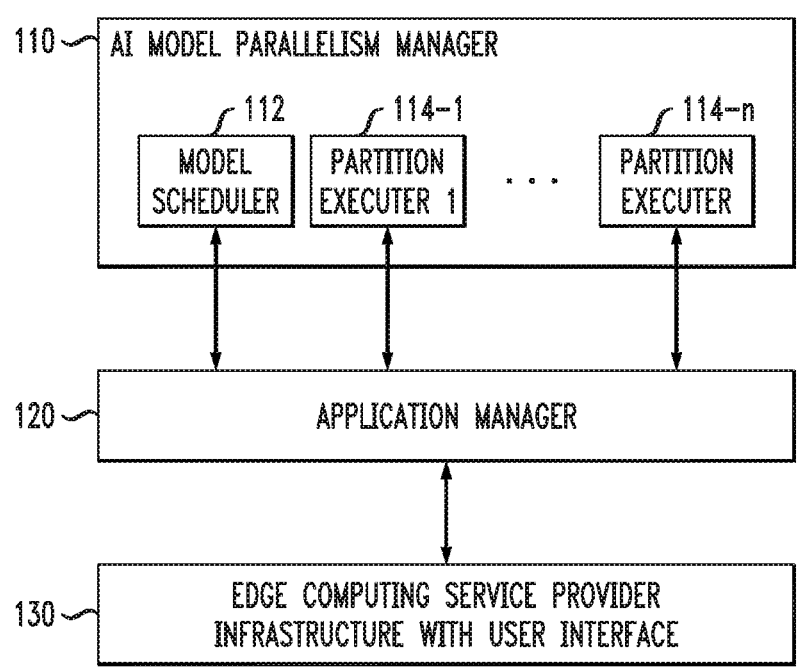
FIG. 1 illustrates an information processing system for managing an artificial intelligence model in an edge computing environment according to an illustrative embodiment.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." The terms "first," "second," and the like may refer to different or the same objects. Other definitions, either explicit or implicit, may be included below.

When an AI model, such as a machine learning (ML) model, a deep learning (DL) model, and/or a data mining (DM) model, is utilized to process data, data is processed in parallel at least in an initial stage. In this manner, in a conventional approach, every computing device (machine) in a given network that executes the subject application, executes the entire ML model thereon to process a respective part of data. However, the growth of AI models has resulted in a single computing device being unable to execute the entire AI model independently. Thus, the concept of model parallelism is employed to execute a large, complicated AI model. For example, model parallelism is when the AI model is split among computing devices such that each computing device works on a part of the AI model.

In the context of model parallelism approaches, artificial (dummy) compiler techniques have been proposed for collecting resource requirements of each computing device, as well as model parallelism partition techniques based on an intermediate representation (IR) that divide the entire model into partitions which can then be computed in parallel by multiple computing devices which also exchange parameters between one another. Further, techniques have been proposed for scheduling each partition into computing devices in a load-balanced manner based on resource requirements of the computation and other resources available on the devices. Still further, techniques have been proposed for scheduling partitions for execution and balancing the computing and memory storage loads based on the resources available on the computing devices. Some of these proposed techniques are implementable for training of large models in graphic processing units (GPUs) distributed in multiple computing nodes in a cloud computing environment.

Illustrative embodiments provide a framework for implementing AI model parallelism in an edge computing environment. Edge computing is a distributed computing paradigm that typically comprises one or more edge servers running one or more application programs that interact with a plurality of heterogeneous computing devices (e.g., X86_64/ARM CPUs (central processing units), FPGAs (field programmable gate arrays), ASICs (application specific integrated circuits), programmable switches, etc.) which are normally computing resource-limited (e.g., limited in terms of processing and/or storage capacities). Furthermore, edge computing is an emerging technology developing together with emerging 5G (3GPP $5^{th}$ Generation)

telecommunication technology and equipped with many deep learning inference applications for autonomous driving, mobile mixed reality, drone pilot, smart home, Internet of Things (IoT) and virtual reality (VR) games, to name a few. Such applications typically need real-time responses or computing offload from servers, which cannot be adequately fulfilled by current cloud computing infrastructure.

The emergence of edge computing is in response to the inability of centralized data centers to provide real-time or near-real-time compute capabilities to the vast (and growing) sources of decentralized data (so-called data "out in the wild"). Edge computing moves the computer workload closer to the consumer/data generator to reduce latency, bandwidth and overhead for the centralized data center and intermediate switches, gateways, and servers.

Accordingly, below is a summary of characteristics of an edge computing environment relevant to illustrative embodiments, which are significantly different than cloud computing environment characteristics:

(i) Heterogeneous: Different from cloud computing, which normally uses homogeneous devices such as all CPU devices (or at most very few types of CPU devices), edge computing (especially fog computing) leverages various compute elements in the network and/or specialized hardware offloads, such as, but not limited to, GPUs, FPGAs and ASICs.

(ii) Restricted computing capacities: Edge computing environments are typically restricted in physical size, available power, and ability to cool critical electronics, and thus do not have the ability to deploy the same size and scale of computing capabilities that a cloud data center would be able to deploy.

(iii) Streamed data as input: Input data from IoT devices (e.g., sensors) to edge servers are typically streamed and collected periodically from the IoT devices, which means that typically the data in a specific timestamp may be similar to, but usually not exactly the same, as the data collected in different timestamps.

(iv) Inference only: It is realized herein that it is desirable to deploy only the AI inference model to an edge computing environment and keep the training model in a cloud computing environment in order to leverage the computing resources in the cloud computing environment while providing the proximity computing or near data source processing in the edge computing environment. In AI technology, inference algorithms perform operations on data and continuously readjust probabilities based on new data to make predictions. Accordingly, an AI inference model (e.g., inference program or inference application) is generated that governs how to make predictions on new data.

Based on the edge computing characteristics described above, it is realized herein that implementation of model parallelism in an edge computing environment is a better solution than in a cloud computing environment for many reasons, examples of which include but are not limited to:

(i) Model parallelism can better perform parallel computing as compared with data parallelism:

a) Data parallelism implements parallel computing based on many models hosted in many computing nodes, with each model processing different datasets in different mini-batches. But for an inference application, on a specific timestamp, there is only one set of input collected from different IoT sensors at the same period and each data set is irrelevant to each other. This means that there is no (or rather difficult to implement) parallel computing at all in data parallelism for a specific set of input on a specific timestamp, i.e., all sets of data must be processed in a single model sequentially.

b) On the other hand, model parallelism implements parallel computing based on different partitions of the same model processing different subsets of the input. This means that even for a single set of input, model parallelism can more easily process the data in parallel.

(ii) The partitions of model parallelism can be accommodated by the resource-limited computing devices in an edge computing environment:

a) In data parallelism, the entire model must be hosted in a single host which is more readily done in a cloud computing environment, but with computing resources so limited in an edge computing environment, sometimes it is impossible to fit a model into any edge nodes at all.

b) On the other hand, model parallelism hosts partitions in different computing nodes. This means that it is relatively easier to find multiple computing devices with limited available computing resources to host all partitions in a model rather than to find a computing node that can host the entire model.

(iii) Model parallelism can fit the heterogeneous computing devices of an edge computing environment more easily:

a) In data parallelism, the compiler can generate the computing code only for the devices presented in a single host. When the application is migrated into a different host with different computing devices (for example, from an X86_64 CPU to an ARM CPU), the entire model must be recompiled. This means that data parallelism cannot manage application migration easily.

b) On the other hand, if a model parallelism application needs to be migrated, it can migrate partition-by-partition such that only partitions that need to be migrated are in fact migrated. This means model parallelism can manage application migration more easily.

(iv) Model parallelism can follow the locations of a mobile customer or geographically distributed IoT sensors more easily:

a) As the entire model of data parallelism must be placed into a single host, when following the location of a mobile customer, the entire model must be moved to the proximate computing nodes of the customer.

b) On the other hand, it is easier to move only partitions which process the input between edge nodes first then other partitions as needed later.

The same rationales apply for the geographically distributed IoT sensors.

(v) Model parallelism fits federated learning more easily:

a) In federated learning, the parameters of different parts of the model are normally input or output from different users (maybe encrypted with different algorithms). It is very difficult to arrange the parameters from different users as a composite input into the entire model.

b) In model parallelism, if it is implemented by partitioning the model based on the computation graph and kernel functions for the computation node, the parameters from different users working on different parameters (input or output) for different kernel functions and the different encryption algorithms can work on different partitions, so it is much easier to combine the federated learning with model parallelism.

In sum, it is realized herein that model parallelism in just about every aspect is a better fit than data parallelism. Further, it is realized herein that model parallelism is a natural solution for use with heterogeneous, restricted computing elements, streamed data input, and inference-only problems on an edge computing platform.

However, to deploy a model parallelism inference application in an edge computing environment, it is realized herein that the following challenges should be considered:
  (i) How to manage application lifecycle, different access technologies such as Long Term Evolution (LTE), 5G, WiFi®, and wired networks, etc., location of mobile users, slicing network cooperation, etc.
  (ii) How to find target computing devices from candidates.
  (iii) How to deploy the partitions onto heterogeneous computing devices.
  (iv) How to re-schedule partitions during application migrations in some cases, for example, to follow the locations of mobile users.

Illustrative embodiments overcome the above and other challenges by providing an AI model parallelism framework that leverages characteristics of an edge computing environment.

FIG. 1 illustrates an information processing system 100 for managing an AI model in an edge computing environment according to an illustrative embodiment. More particularly, FIG. 1 shows a hierarchical framework and message/service interaction architecture comprising an AI model parallelism manager 110 with a model scheduler 112 and a plurality of partition executers 114-1 . . . 114-n, an application manager 120 and edge computing service provider infrastructure with user interface 130. Each of 110, 120 and 130 may be considered layers as will be further described herein.

In one or more illustrative embodiments, edge computing service provider infrastructure with user interface 130 leverages an open-source or industry infrastructure such as Intel OpenNESS® or Amazon Web Services IoT Greengrass®. However, any other suitable edge computing infrastructure, or combinations of two or more edge computing infrastructures from different service providers, may be part of edge computing service provider infrastructure with user interface 130.

Application manager 120 is assumed in one or more illustrative embodiments to manage a single instance model parallelism inference application or program to isolate edge services provided by the lower-layer edge computing service provider infrastructure with user interface 130 in cooperation with the above-layer AI model parallelism manager 110. In one or more illustrative embodiments, AI model parallelism manager 110 implements model partitioning, parallel scheduling, and execution of partitions using techniques described in one or more of U.S. Ser. No. 16/540,385, filed on Aug. 14, 2019, and entitled "Method, Device, and Computer Program Product for Determining a Resource Required for Executing a Code Segment," (now U.S. Pat. No. 11,354,159), U.S. Ser. No. 16/678,758, filed on Nov. 8, 2019, and entitled "Method, Electronic Device and Computer Program Product for Processing Machine Learning Model," (now U.S. Pat. No. 11,461,291), and U.S. Ser. No. 16/823,445, filed on Mar. 19, 2020, and entitled "Scheduling Model Partitions Based on Resource," know U.S. Pat. No. 11,416,289), the disclosures of which are incorporated herein by reference in their entireties, but adapted in accordance with illustrative embodiments for implementation in an edge computing environment, e.g., edge computing service provider infrastructure with user interface 130. Such functionalities are provided at least in part by the model scheduler 112 and the plurality of partition executers 114-1 . . . 114-n as will be further explained. Each of layers 110, 120 and 130 is described in further detail below.

Typically, an edge computing infrastructure provides services such as, but not limited to:
  (i) Networking services such as multi-access (e.g., 5G, LTE or Internet Protocol (IP)), domain name service, radio information management, UE mobility sensitive, edge node network interface configuration, etc.
  (ii) Platform management services such as a platform awareness service, edge node enrollment/selection, edge node virtualization, network function virtualization, application traffic management, application authentication, etc.
  (iii) Edge application API support such as producer/consumer application register, edge service activation/deactivation, edge service discovery, edge service subscription/un-subscription, edge service notification update, edge service data update, etc.
  (iv) Application deployment and lifecycle management services.

It is assumed that edge computing service provider infrastructure with user interface 130 leverages services such as the above listed ones and others as will be further described below.

In one or more illustrative embodiments, application manager 120 itself may be deployed by a controller from a web user interface (UI) and managed by an edge computing service provider infrastructure controller (e.g., Intel OpenNESS®) itself as an application. The application manager 120 manages a single inference application instance and functions as an intermediate layer between the edge computing service provider infrastructure with user interface (layer) 130 and the AI model parallelism manager (layer) 110. More particularly, the application manager (layer) 120:
  (i) Cooperates with the edge computing service provider infrastructure with user interface layer 130 to manage all networking services and to steer data collected from IoT devices (that are part of the infrastructure layer) as input to the AI model parallelism manager layer 110.
  (ii) Exposes the platform hardware information of the edge computing service provider infrastructure with user interface layer 130 to the AI model parallelism manager layer 110 so that the AI model parallelism manager layer 110 is informed of the computing hardware available for inference (e.g., by registering an enhanced platform awareness (EPA) service with the edge computing service provider infrastructure with user interface layer 130).
  (iii) Registers with a user equipment (UE) mobility service with the edge computing service provider infrastructure with user interface layer 130 to follow the locations of mobile IoTs.
  (iv) Registers with an edge node enrollment/selection service with the edge computing service provider infrastructure with user interface layer 130 so that in the case where the locations of mobile users are changed, the model scheduler 112 can migrate the partitions to a partition executer 114 more proximate (geographically closer) to the user (customer/client).
  (v) Registers with a migration service with the edge computing service provider infrastructure with user interface layer 130 to enable infrastructure services to migrate the model parallelism application in case a mobile IoT device has changed its geographic location.

(vi) Registers with other services such as but not limited to application lifecycle management, application deployment services, etc.

Figure 2A:
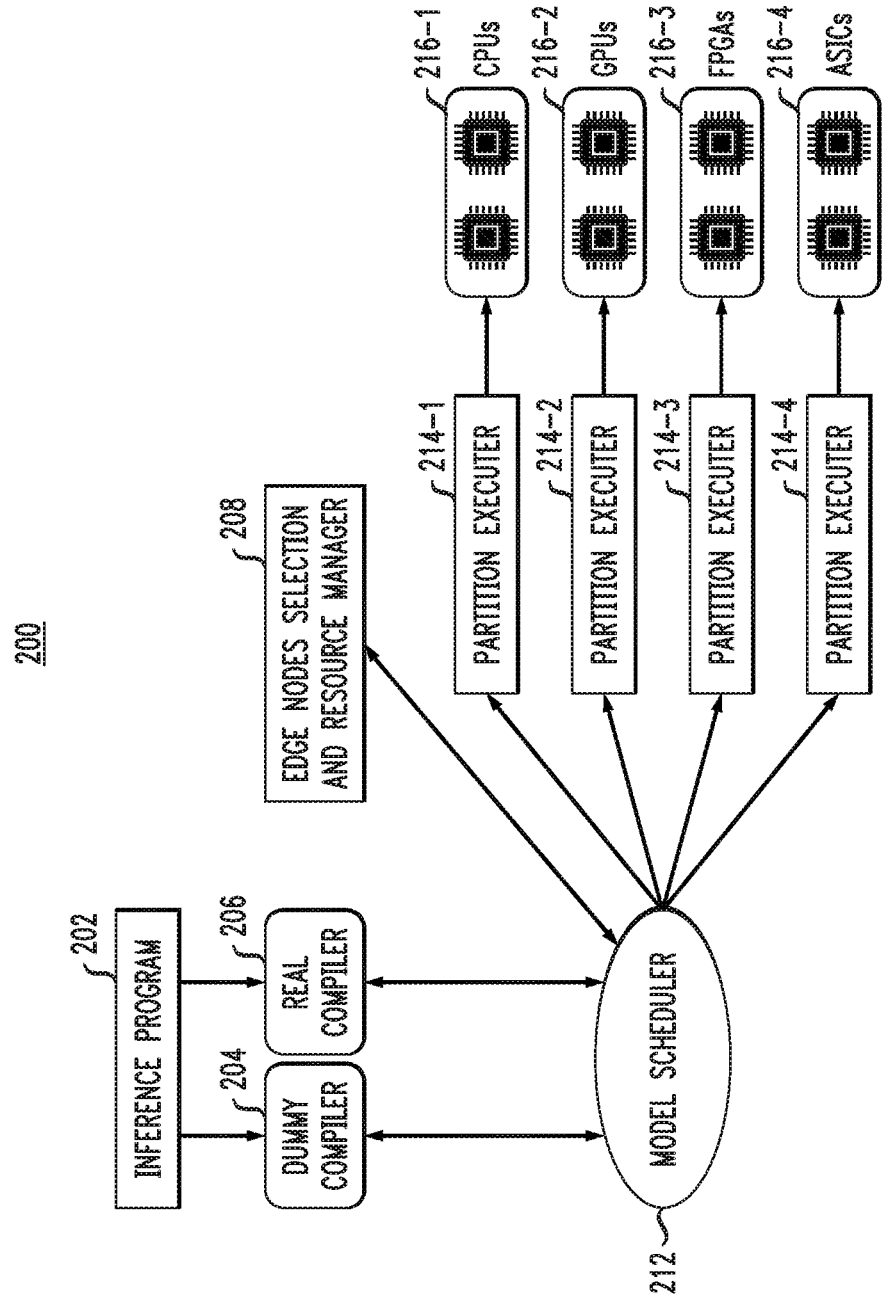
FIG. 2A illustrates an artificial intelligence model parallelism manager layer according to an illustrative embodiment.

AI model parallelism manager 110 according to an illustrative embodiment is shown in more detail in FIG. 2A as architecture 200 comprising an inference program 202 (i.e., AI model), a dummy (artificial) compiler 204, a real compiler 206 (compiler that actually compiles the model for deployment), edge nodes selection and resource manager 208, a model scheduler 212, a plurality of partition executers 214-1, 214-2, 214-3 and 214-4, also referred to individually or collectively as 214, and edge nodes 216-1 (CPUs), 216-2 (GPUs), 216-3 (FPGAs) and 216-4 (ASICs), also referred to individually or collectively as 216. Edge nodes are the heterogeneous computing devices of the edge computing environment upon which model partitions are deployed and executed.

Architecture 200 is managed by application manager 120 and schedules the partitions for a single model parallelism instance, i.e., inference program 202. The edge nodes selection and resource manager 208 identifies currently-available edge nodes and their platform hardware information for the application manager 120 based on the edge enrollment/selection services and the location services mediated by the application manager 120. Dummy compiler 204 artificially compiles the model (inference program 202) to generate a computation graph for partitioning and to obtain the resource requirements for each partition. By artificial compiling, it is meant that the compiling is performed to obtain resource requirements for the model (while real compiler 206 will compile the model for deployment and execution on the edge nodes 216 as explained further below). In one illustrative embodiment, resource requirement collection from dummy deep learning compiler techniques and intermediate computation graph generation techniques described in the above-referenced U.S. Ser. No. 16/540,385, (now U.S. Pat. No. 11,354,159), can be implemented by the dummy compiler 204.

Model scheduler 212 partitions the model (inference program 202) which can be executed in parallel and generates a scheduling plan based on the computation graph and on the resource requirement/resource available on the target edge nodes 216 from the selected computing nodes hardware information. In one or more illustrative embodiments, techniques described in the above-referenced U.S. Ser. No. 16/678,758, (now U.S. Pat. No. 11,461,291), can be implemented by the model scheduler 212.

Further, model scheduler 212 partitions the intermediate computing graph into a forest of sub-graphs based on the scheduling plan and sends each sub-graph with its target device to a cross-framework compiler, i.e., real compiler 206. The cross-framework compiler, i.e., real compiler 206, compiles the sub-graphs based on the targeting devices (e.g., CPUs 216-1, GPUs 216-2, FPGAs 216-3 and ASICs 216-4) to generate a runtime library (instance) for each partition based on its heterogeneous target computing devices. In one or more illustrative embodiments, a remote procedure call (RPC) server can be implemented as part of model scheduler 212 to dispatch each partition to a partition executer 214 for execution as described in the above-referenced U.S. Ser. No. 16/540,385, (now U.S. Pat. No. 11,354,159). Model scheduler 212 sends the inference results to application manager 120.

Still further, model scheduler 212 subscribes to the edge nodes selection update notification service with the application manager 120 to receive the updated edge computing nodes for this inference model based on the edge nodes enrollment/selection services and the location services mediated by the application manager 120. Lastly, model scheduler 212 re-schedules the partitions to the updated partition executers 214 with the application migration service provided by an API of the edge computing service provider infrastructure with user interface 130.

Partition executers 214 are managed by the application manager 120 for their lifecycles and deployments. The main functions of each partition executer 214 are: (i) receives the input from the application manager 120; (ii) accepts parameters from the model scheduler 212; (iii) launches an RPC client to execute the computation assigned by the model scheduler 212 by running this computation on its CPUs, or calling a driver or software development kit (SDK) APIs of hosted FPGAs, ASICs or GPUs; and (iv) sends the computation outputs to other partition executers 214 or back to the model scheduler 212 according to commands from the model scheduler 212.

Figure 2B:
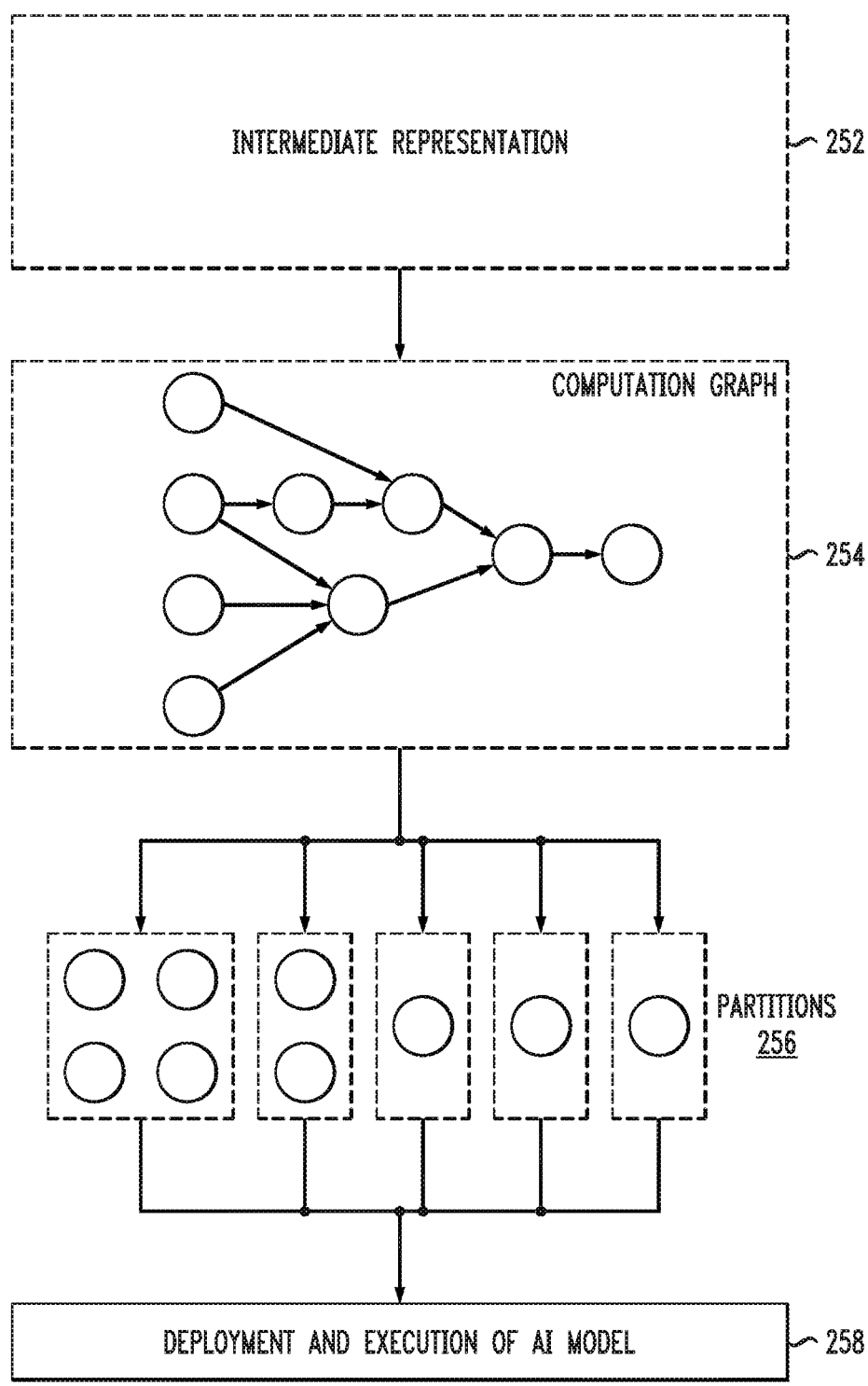
FIG. 2B illustrates processing of an artificial intelligence model according to an illustrative embodiment.

FIG. 2B illustrates a processing methodology 250 of an AI model according to an illustrative embodiment. More particularly, FIG. 2B illustrates parts of a deep learning framework front-end. As shown, an intermediate representation 252 of an AI model is obtained from the AI model written in a source language. In some embodiments, an AI model compiled in a source language may be written in different source languages, for example, CUDA, Java®, Python®, C++, Fortran, Ada, C #, and the like. In some embodiments, an AI model written in a source language may be determined by different frameworks. The above examples are provided merely for illustrative purposes and not intended to be limiting.

In some embodiments, the intermediate representation 252 of the AI model may be obtained by a compiler through compiling the AI model written in a source language. The intermediate representation 252 is a data structure or code for representing source code.

The intermediate representation 252 of the AI model is processed to generate a computation graph 254 based on the intermediate representation 252 of the AI model. Nodes (circles) in the computation graph 254 represent functions in the AI model. The computation graph 254 also illustrates dependencies between functions using directed edges (arrows). For example, a directed edge in the computation graph 254 represents that an input of a function corresponding to the end point of the directed edge is dependent on an output of a function corresponding to the starting point of the directed edge. Additionally, or alternatively, the computation graph 254 can be a directed acyclic graph. The computation graph 254 in FIG. 2B is provided merely as an example for describing a computation graph. The number of nodes in a computation graph and the structure of the computation graph may be generated in any appropriate form, based on an intermediate representation 252 of the AI model.

The computation graph 254 is partitioned into a plurality of parts in sequence, including as illustratively shown: a first part, a second part, a third part, a fourth part, and a fifth part as collectively referenced in FIG. 2B as partitions 256. In some embodiments, partitions can be based on in-degrees of nodes (in-degree of a node represents the number of directed edges directed to the node). Partitions 256 are then deployed and executed as collectively referenced in FIG. 2B as 258. It is to be understood that processing methodology 250 in FIG. 2B is one example of AI model processing and not intended to necessarily limit embodiments described herein.

Figure 5:
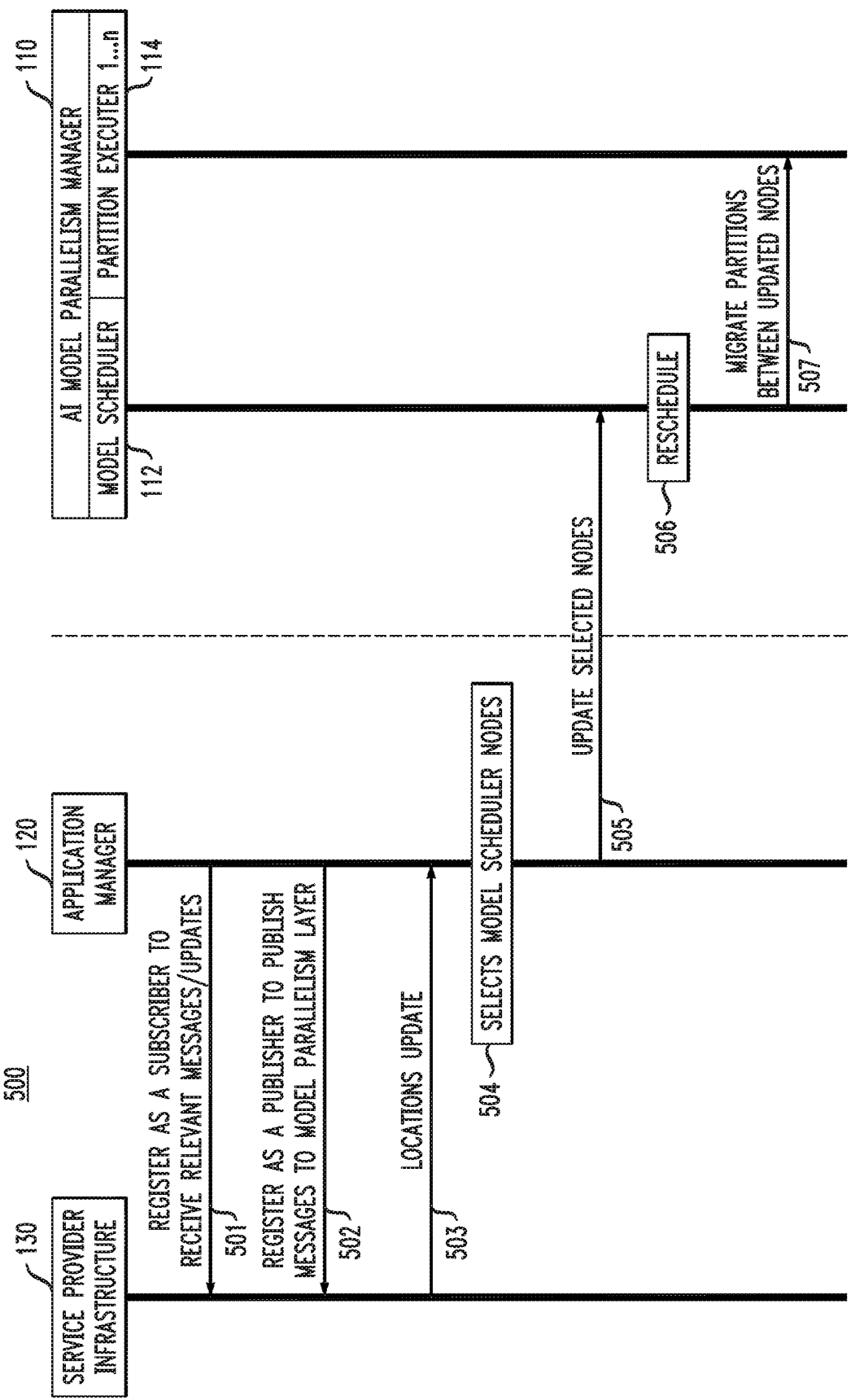
FIG. 5 illustrates at least yet another part of a message flow for managing an artificial intelligence model in an edge computing environment according to an illustrative embodiment.

Given the illustrative frameworks and architectures described above with respect to FIGS. 1, 2A and 2B, methodologies for implementing inference model parallelism in an edge computing environment are further explained in the workflows depicted in FIGS. 3, 4 and 5.

In one or more illustrative embodiments, end users can configure and deploy an inference application through a UI provided by the edge computing service provider infrastructure with user interface 130, e.g., Intel OpenNESS® or AWS IoT Greengrass®. By way of example only, with the Intel OpenNESS® edge computing infrastructure, end users are able to log into the OpenNESS® controller web UI to submit an application request with associated information for all IoT devices (from which the inference input data comes), the deep learning inference program, parameter files, etc. The OpenNESS® controller creates an application manager instance for this application from an application image repository and starts this application manager (120 in FIG. 1) using the application lifecycle service.

FIG. 3 depicts a workflow 300 between edge computing service provider infrastructure with user interface 130, application manager 120 and AI model parallelism manager 110. More particularly, workflow 300 illustrates application manager initialization.

In step 301, after instantiation (e.g., instance creation), application manager 120 registers with the edge computing service provider infrastructure with user interface 130 as a subscriber to receive relevant messages/updates such as those messages/updates relating to application deployment/lifecycle management, hardware information, data traffic, UE mobility and migration, edge nodes enrollment and selection, and steering data from IoT devices.

In step 302, application manager 120 registers as a publisher to publish services received from the edge computing service provider infrastructure with user interface 130 to the model scheduler 112 of the AI model parallelism manager 110.

In step 303, application manager 120 selects the edge computing nodes (i.e., edge node) for this application based on the result of the edge nodes enrollment/selection services with respect to the geographic distribution of the IoT devices.

In step 304, from the edge computing nodes identified in step 303, application manager 120 selects edge computing nodes for this application which are geographically proximate to partition executers 114 associated with the model scheduler 112.

In step 305, application manager 120 launches model scheduler 112.

In step 306, application manager 120 uploads the inference program and corresponding parameter file to model scheduler 112 (or otherwise instructs model scheduler 112 where to find the inference program and the corresponding parameter file).

In step 307, application manager 120 sends the list of edge computing nodes (selected in step 304) with their platform hardware information to model scheduler 112.

In step 308, application manager 120 launches the partition executers 114 on the selected edge computing nodes.

FIG. 4 depicts a workflow 400 between model scheduler 112 and a partition executer 114 (executing on a selected edge computing node, i.e., IoT device).

In step 401, model scheduler 112 obtains a computation graph (CG) by enabling dummy compiling of the inference program as explained above (204 in FIG. 2A).

In step 402, model scheduler 112 obtains resource requirements by enabling dummy compiling of the inference program as explained above (204 in FIG. 2A).

In step 403, based on the computation graph and resource requirements, model scheduler 112 generates a scheduling plan for the inference program.

In step 404, based on the scheduling plan, model scheduler 112 enables real compiling as explained above (206 in FIG. 2A) of the partitions to instruction set architecture (ISA) specific runtime libraries which can, by way of example, be X86_64/ARM CPUs or links to the FPGAs/ASCs/GPUs drivers or SDKs.

In step 405, model scheduler 112 launches its RPC server and waits for the connection request from the partition executers 114.

In step 406, for each one of the partition executers 114, the partition executer launches an RPC client.

In step 407, for each one of the partition executers 114, the RPC client of the partition executer connects with the RPC server of model scheduler 112.

In step 408, after RPC connection, model scheduler 112 dispatches, via its RPC connections, the partitions to the partition executers 114 for execution.

In step 409, for each one of the partition executers 114, the partition executer executes the model partition assigned thereto.

In step 410, for each one of the partition executers 114, the partition executer sends the model partition execution result to model scheduler 112.

In step 411, model scheduler 112 sends the inference results received from the partition executers to application manager 120, which then sends the inference results to the OpenNESS® controller which triggers responses as appropriate to users.

FIG. 5 depicts a workflow 500 associated with migration of the inference program partitions when locations of one or more mobile users (edge computing nodes) change. In such cases, the inference program should follow the IoT mobile geographic locations. More particularly, workflow 500 shows the steps that occur between edge computing service provider infrastructure with user interface 130, application manager 120 and AI model parallelism manager 110 during such migration scenarios.

Steps 501 and 502 are the same as steps 301 and 302 described above in FIG. 3. It is assumed that they have been performed. Also, it is assumed that edge computing service provider infrastructure with user interface 130 updates its IoT devices list (edge nodes list) by evicting some IoT devices and adding some new ones into the IoT devices list and then notifying application manager 120.

In step 503, edge computing service provider infrastructure with user interface 130 provides location updates to application manager 120.

In step 504, application manager updates its selected partition executer/edge node list based on the edge nodes enrollment/selection service provided by edge computing service provider infrastructure with user interface 130.

In step 506, model scheduler 112 generates an updated scheduling plan (i.e., re-scheduling plan).

In step 507, model scheduler 112 enables migration of partition executers from evicted edge nodes to newly added edge nodes with the migration service provided by edge computing service provider infrastructure with user interface 130.

Accordingly, as explained above, illustrative embodiments provide many advantages, for example, they:
 (i) Leverage model parallelism to partition an AI model (inference program) based on a computation graph and execute each partition with a remote function call.
 (ii) Obtain resource requirements for each partition and schedule each partition for parallel computing into computing devices.
 (iii) Leverage a cross-framework compiler to generate ISA specific runtime libraries for heterogeneous computing devices.
 (iv) Leverage services provided by an edge computing service provider infrastructure to manage access, virtualization of computing and network function, UE mobility, etc., so as to manage application deployment, migration, lifecycle management, etc.
 (v) Use an intermediate application manager layer so that a model parallelism implementation can be integrated into an edge computing environment.

FIG. 6 illustrates a block diagram of an example processing device or, more generally, an information processing system 600 that can be used to implement illustrative embodiments. For example, one or more components in FIGS. 1, 2A and 2B can comprise a processing configuration such as that shown in FIG. 6 to perform steps described above in the context of FIGS. 3, 4 and 5. Note that while the components of system 600 are shown in FIG. 6 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 600 can include multiple processing devices, each of which comprise the components shown in FIG. 6.

As shown, the system 600 includes a central processing unit (CPU) 601 which performs various appropriate acts and processing, based on a computer program instruction stored in a read-only memory (ROM) 602 or a computer program instruction loaded from a storage unit 608 to a random access memory (RAM) 603. The RAM 603 stores therein various programs and data required for operations of the system 600. The CPU 601, the ROM 602 and the RAM 603 are connected via a bus 604 with one another. An input/output (I/O) interface 605 is also connected to the bus 604.

The following components in the system 600 are connected to the I/O interface 605, comprising: an input unit 606 such as a keyboard, a mouse and the like; an output unit 607 including various kinds of displays and a loudspeaker, etc.; a storage unit 608 including a magnetic disk, an optical disk, and etc.; a communication unit 609 including a network card, a modem, and a wireless communication transceiver, etc. The communication unit 609 allows the system 600 to exchange information/data with other devices through a computer network such as the Internet and/or various kinds of telecommunications networks.

Various processes and processing described above may be executed by the CPU 601. For example, in some embodiments, methodologies described herein may be implemented as a computer software program that is tangibly included in a machine readable medium, e.g., the storage unit 608. In some embodiments, part or all of the computer programs may be loaded and/or mounted onto the system 600 via ROM 602 and/or communication unit 609. When the computer program is loaded to the RAM 603 and executed by the CPU 601, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
a processor; and
a memory storing computer program instructions, the processor executing the computer program instructions in the memory to control the apparatus to:
obtain an intermediate representation of an artificial intelligence model;
obtain a computation graph generated based on the intermediate representation;
partition the computation graph into a set of partitions;
schedule the set of partitions for respective execution on a set of computing devices in an edge computing environment; and
cause deployment of the set of partitions respectively to the set of computing devices for execution in the edge computing environment;
wherein the obtaining, partitioning, scheduling, and causing deployment operations are performed in accordance with a model parallelism manager layer in coordination with an application manager layer; and
wherein the application manager layer is interposed between the model parallelism manager layer and the edge computing environment.

2. The apparatus of claim 1, wherein causing deployment of the set of partitions to the set of computing devices further comprises a model scheduler dispatching a set of partition executers for execution to the set of computing devices in the edge computing environment.

3. The apparatus of claim 2, wherein the model scheduler is configured as a remote procedure call server and the set of partition executers are configured as remote procedure call clients; and
wherein the model scheduler and the set of partition executers are implemented by the model parallelism manager layer.

4. The apparatus of claim 1, wherein scheduling the set of partitions further comprises obtaining resource requirements for execution of the set of partitions in order to generate a scheduling plan.

5. The apparatus of claim 1, wherein the processor further executes the computer program instructions in the memory to control the apparatus to compile each of the set of partitions to generate a runtime instance specific to a type of computing device on which each partition is to be executed.

6. The apparatus of claim 1, wherein the processor further executes the computer program instructions in the memory to control the apparatus to re-schedule and cause re-deployment of one or more of the set of partitions when one or more of the computing devices in the edge computing environment change geographic locations.

7. The apparatus of claim 1, wherein the intermediate representation of the artificial intelligence model is obtained from the artificial intelligence model written in a source language.

8. A method, comprising:
obtaining an intermediate representation of an artificial intelligence model;
obtaining a computation graph generated based on the intermediate representation;
partitioning the computation graph into a set of partitions;
scheduling the set of partitions for respective execution on a set of computing devices in an edge computing environment; and
causing deployment of the set of partitions respectively to the set of computing devices for execution in the edge computing environment;
wherein the method is performed by one or more processing devices;
wherein the obtaining, partitioning, scheduling and causing deployment are performed in accordance with a model parallelism manager layer in coordination with an application manager layer; and
wherein the application manager layer is interposed between the model parallelism manager layer and the edge computing environment.

9. The method of claim 8, wherein causing deployment of the set of partitions to the set of computing devices further comprises dispatching, via a model scheduler, a set of partition executers for execution to the set of computing devices in the edge computing environment.

10. The method of claim 9, wherein the model scheduler is configured as a remote procedure call server and the set of partition executers are configured as remote procedure call clients; and
wherein the model scheduler and the set of partition executers are implemented by the model parallelism manager layer.

11. The method of claim 8, wherein scheduling the set of partitions further comprises obtaining resource requirements for execution of the set of partitions in order to generate a scheduling plan.

12. The method of claim 8, further comprising compiling each of the set of partitions to generate a runtime instance specific to a type of computing device on which each partition is to be executed.

13. The method of claim 8, further comprising re-scheduling and causing re-deployment of one or more of the set of partitions when one or more of the computing devices in the edge computing environment change geographic locations.

14. The method of claim 8, wherein the intermediate representation of the artificial intelligence model is obtained from the artificial intelligence model written in a source language.

15. A computer program product stored on a non-transitory computer-readable medium and comprising machine executable instructions, the machine executable instructions, when executed, causing a processing device to:
obtain an intermediate representation of an artificial intelligence model;
obtain a computation graph generated based on the intermediate representation;
partition the computation graph into a set of partitions;
schedule the set of partitions for respective execution on a set of computing devices in an edge computing environment; and
cause deployment of the set of partitions respectively to the set of computing devices for execution in the edge computing environment;
wherein the obtaining, partitioning, scheduling and causing deployment are performed in accordance with a model parallelism manager layer in coordination with an application manager layer; and
wherein the application manager layer is interposed between the model parallelism manager layer and the edge computing environment.

16. The computer program product of claim 15, wherein causing deployment of the set of partitions to the set of computing devices further comprises a model scheduler dispatching a set of partition executers for execution to the set of computing devices in the edge computing environment, wherein the model scheduler is configured as a remote procedure call server and the set of partition executers are configured as remote procedure call clients, and wherein the model scheduler and the set of partition executers are implemented by the model parallelism manager layer.

17. The computer program product of claim 15, wherein scheduling the set of partitions further comprises obtaining resource requirements for execution of the set of partitions in order to generate a scheduling plan.

18. The computer program product of claim 15, wherein the machine executable instructions, when executed, further cause the processing device to compile each of the set of partitions to generate a runtime instance specific to a type of computing device on which each partition is to be executed.

19. The computer program product of claim 15, wherein the machine executable instructions, when executed, further cause the processing device to re-schedule and cause re-deployment of one or more of the set of partitions when one or more of the computing devices in the edge computing environment change geographic locations.

20. The computer program product of claim 15, wherein the intermediate representation of the artificial intelligence model is obtained from the artificial intelligence model written in a source language.

* * * * *